(12) United States Patent
Dehnert et al.

(10) Patent No.: US 10,189,512 B2
(45) Date of Patent: Jan. 29, 2019

(54) MECHANICAL CONTROL LINKAGE

(71) Applicant: Clark Equipment Company, West Fargo, ND (US)

(72) Inventors: Brian P. Dehnert, Mandan, ND (US); Ronald S. Hansen, Leonard, ND (US); Matthew J. Kaldor, Bismarck, ND (US); Jeret L. Hoesel, Bismarck, ND (US); Jonathan J. Roehrl, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 70 days.

(21) Appl. No.: 15/424,415

(22) Filed: Feb. 3, 2017

(65) Prior Publication Data

US 2017/0225722 A1 Aug. 10, 2017

Related U.S. Application Data

(60) Provisional application No. 62/292,539, filed on Feb. 8, 2016, provisional application No. 62/291,861, filed on Feb. 5, 2016.

(51) Int. Cl.
*B60K 26/00* (2006.01)
*B62D 33/073* (2006.01)
*B62D 33/067* (2006.01)

(52) U.S. Cl.
CPC ......... *B62D 33/073* (2013.01); *B62D 33/067* (2013.01)

(58) Field of Classification Search
CPC ....... B62D 33/067; E02F 9/0883; E02F 9/166
(Continued)

(56) References Cited

U.S. PATENT DOCUMENTS 1,203,955 A 11/1916 Adams
1,255,220 A 2/1918 Petry
(Continued)

FOREIGN PATENT DOCUMENTS

DE 19542473 C1 4/1997
DE 19735289 A1 2/1999
(Continued)

OTHER PUBLICATIONS

International Search Report and Written Opinion dated Jul. 3, 2017 for International Application No. PCT/US2017/016525 filed Feb. 3, 2017, 13 pages.

*Primary Examiner* — Toan C To
(74) *Attorney, Agent, or Firm* — John D. Veldhuis-Kroeze; Westman, Champlin & Koehler, P.A.

(57) ABSTRACT

A mechanical linkage between operator input devices and actuators including a junction having a first portion operably coupled to an operator input device and a second portion operably coupled to an actuator. The first and second portions of the junction are connected when a cab is in an operating position and disconnected when a cab is in a service position. When connected, the first and second portions create a solid connection between the operator input device and the actuator. When the first and second portions are disconnected, the operator input will be not be operably coupled to the actuator. Movement of the cab to the operating position will cause the first and second portions to become connected and movement away from the operating position will cause the first and second portions to become disconnected.

12 Claims, 7 Drawing Sheets

(58) Field of Classification Search
USPC ........ 180/326, 327, 328, 329, 330, 331, 334
See application file for complete search history.

(56) References Cited

U.S. PATENT DOCUMENTS

| | | | | |
|---|---|---|---|---|
| 3,765,500 A * | 10/1973 | Reeves | ................. | B62D 33/07 |
| | | | | 180/328 |
| 4,126,202 A | 11/1978 | Hern | | |
| 4,156,474 A * | 5/1979 | Aida | ...................... | B60K 20/04 |
| | | | | 180/328 |
| 4,206,826 A * | 6/1980 | McMillen | .............. | B60K 20/04 |
| | | | | 180/328 |
| 4,210,221 A * | 7/1980 | McMillen | .............. | B60K 20/04 |
| | | | | 180/328 |
| 4,222,451 A * | 9/1980 | Lamb | ................... | B62D 33/067 |
| | | | | 180/89.18 |
| 4,269,282 A * | 5/1981 | Meacock, II | .......... | B60K 20/04 |
| | | | | 180/328 |
| 4,276,953 A * | 7/1981 | Penzotti | ................. | B60K 20/04 |
| | | | | 180/328 |
| 4,388,980 A | 6/1983 | Vig et al. | | |
| 4,391,344 A | 7/1983 | Weber et al. | | |
| 4,397,371 A | 8/1983 | Lynnes et al. | | |
| 4,779,481 A | 10/1988 | Natzke et al. | | |
| 4,869,337 A * | 9/1989 | Wagner | ................. | B60N 2/143 |
| | | | | 180/330 |
| 4,875,385 A | 10/1989 | Sitrin | | |
| 5,038,887 A * | 8/1991 | Sousek | ................... | B60K 26/02 |
| | | | | 180/327 |
| 5,197,347 A | 3/1993 | Moffitt et al. | | |
| 5,207,289 A | 5/1993 | Wilmo | | |
| 5,553,992 A | 9/1996 | Ashcroft | | |
| 5,927,153 A | 7/1999 | Bhangoo et al. | | |
| 6,023,995 A | 2/2000 | Riggle | | |
| 6,170,355 B1 | 1/2001 | Fay, III | | |
| 6,526,846 B1 | 3/2003 | Duppong et al. | | |
| 7,588,287 B2 * | 9/2009 | Case | ....................... | B60N 2/10 |
| | | | | 180/89.15 |
| 7,757,806 B2 * | 7/2010 | Bower | ..................... | B60N 2/06 |
| | | | | 180/326 |
| 7,849,941 B2 | 12/2010 | Bares et al. | | |
| 8,651,220 B2 * | 2/2014 | Connor | ................. | E02F 9/2004 |
| | | | | 180/326 |
| 2006/0207822 A1* | 9/2006 | Taylor | .................... | B60N 2/143 |
| | | | | 180/326 |
| 2010/0003117 A1 | 1/2010 | Yamashita et al. | | |

FOREIGN PATENT DOCUMENTS

| | | |
|---|---|---|
| DE | 10306368 B3 | 8/2004 |
| EP | 0909856 A2 | 4/1999 |
| WO | 82/00809 A1 | 3/1982 |

* cited by examiner

MECHANICAL CONTROL LINKAGE

CROSS REFERENCE TO RELATED APPLICATIONS

This application claims the benefit of U.S. Provisional Application No. 62/291,861, filed Feb. 5, 2016 and U.S. Provisional Application No. 62/292,539, filed Feb. 8, 2016.

BACKGROUND

This disclosure is directed toward power machines. More particularly, this disclosure is directed toward power machines with mechanical linkage between operator input devices and actuators that are controlled by the operator input devices. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Some work vehicles and other power machines have cabs that define, at least in part, an operator station from which an operator can access and manipulate operator control devices for controlling actuators that perform work functions. Among those functions include, but are not necessarily limited to drive control. Often, operator control devices such as levers, foot pedals, or joysticks are mechanically linked to actuators such as hydrostatic drive pumps, hydraulic control valves, and the like. Some of these cabs are positioned to cover various components that may need service from time to time. In some of these machines, the cabs can be moved between an operating position, where an operator can be seated or otherwise positioned to operate the power machine and a service position so that components that are otherwise covered by the cab can be accessed for servicing.

The discussion above is merely provided for general background information and is not intended to be used as an aid in determining the scope of the claimed subject matter.

SUMMARY

This disclosure is directed toward mechanical linkage between operator input devices and actuators. In one embodiment, the mechanical linkage includes a junction having two parts, a first portion that is operably coupled to an operator input device and a second portion that is operably coupled to an actuator. The first and second portions of the junction are configured to be connected to each other when a cab is in an operating position and disconnected when a cab is in a service position. When connected to each other, the first and second portions of the junction create a solid connection between the operator input device and the actuator such that manipulating the operator input device will cause a control signal to be transmitted via the mechanical linkage to the actuator. When the first and second portions of the junction are disconnected, the operator input will be not be operably coupled to the actuator and manipulation of the operator input will not cause a control signal to be transmitted to the actuator. The junction is further configured such that movement of the cab to the operating position will cause the first and second portions of the junction to become connected and movement of the cab away from the operating position will cause the first and second portions of the junction to become disconnected.

In one embodiment, a control linkage between an operator input assembly in a cab of a power machine and an actuator coupled to a frame of the power machine is disclosed. The control linkage includes a junction mechanism configured to make a connection between the operator input assembly and the actuator when the cab is moved to an operating position relative to the frame of the power machine. The control linkage is also configured to break the connection between the operator input assembly and the actuator when the cab is moved to a service position relative to the frame of the power machine.

In another embodiment, a power machine is disclosed. The power machine has a frame, a drive pump assembly coupled to the frame, and a cab pivotally coupled to the frame and configured to be pivoted relative to the frame between an operating position and a service position. An operator input assembly is positioned in the cab and a control linkage between the operator input assembly and the drive pump assembly includes a junction mechanism configured to make a connection between the operator input assembly and the drive pump assembly when the cab is moved to the operating position and to break the connection between the operator input assembly and the drive pump assembly when the cab is moved to the service position.

In another embodiment, a method of coupling an operator input assembly in a cab of a power machine to a drive pump assembly coupled to a frame of the power machine is disclosed. The method includes moving the cab relative to the frame from a service position to an operating position while the operator input assembly is disconnected from the drive pump assembly and moves with the cab. Moving the cab from the service position to the operating position causes a connection to be made between the operator input assembly and the drive pump assembly.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for the purpose of description and should not be regarded as limiting. Words such as "including," "comprising," and "having" and variations thereof as used herein are meant to encompass the items listed thereafter, equivalents thereof, as well as additional items.

Figure 2:
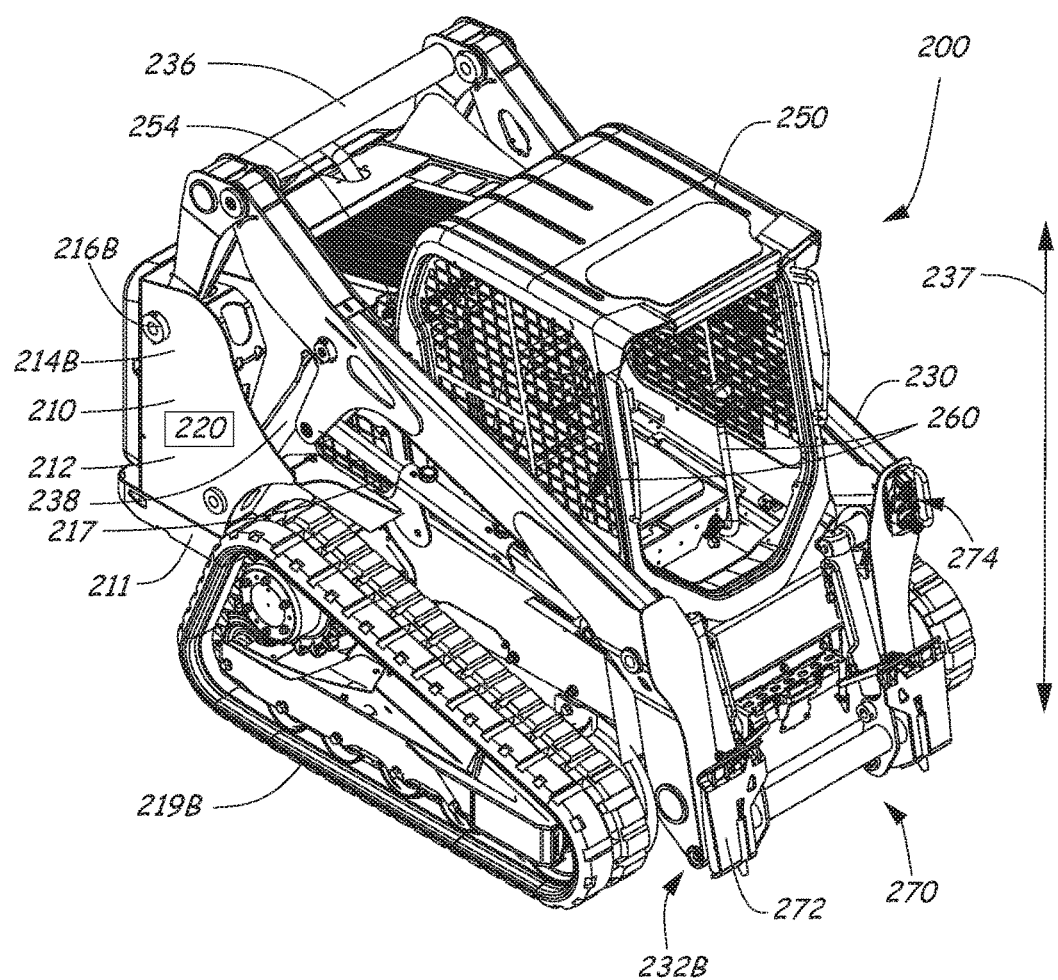
FIG. 2 is a side elevation view of a representative power machine of the type on which the disclosed embodiments can be practiced.
Figure 3:
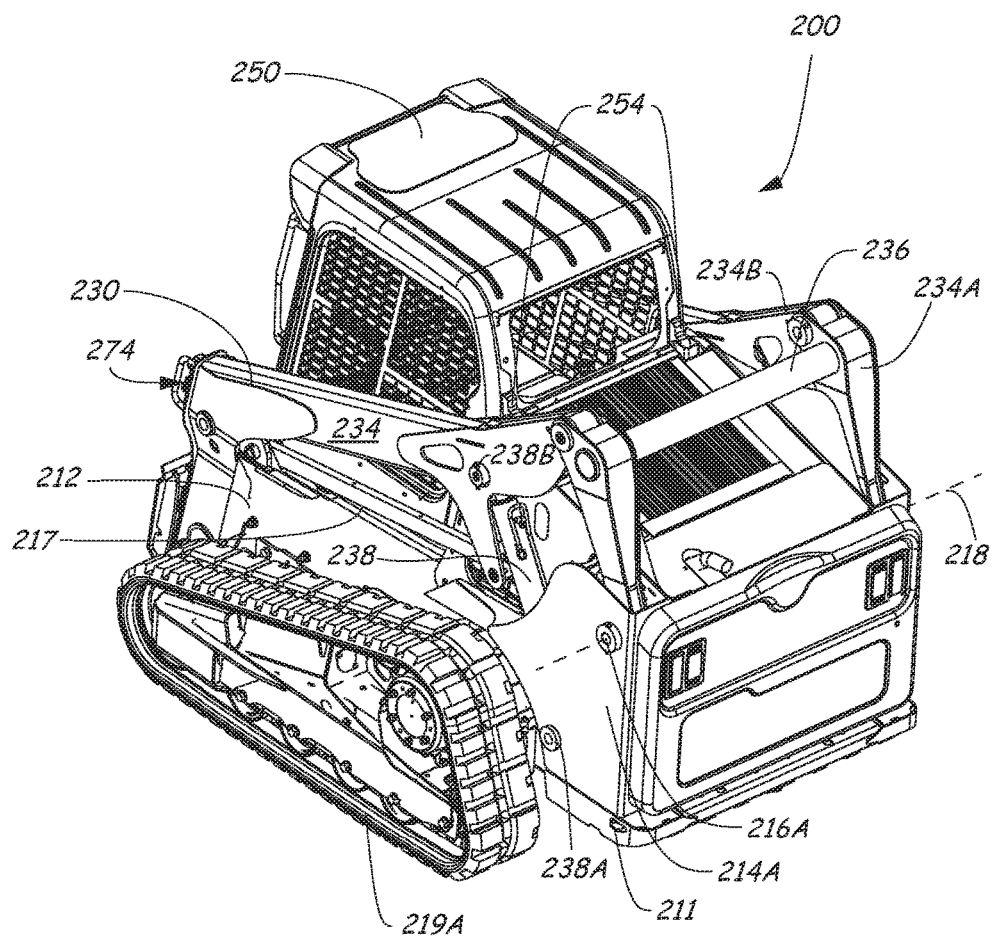
FIG. 3 is a perspective view of the representative power machine of FIG. 2.

Below are embodiments that disclose mechanical linkage systems between an operator input devices and actuators. These mechanical linkage systems have a detachable junction to allow a selective connection/disconnection between the operator input devices and actuators without requiring fasteners to make the connection. These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is discussed. However, as mentioned above, the embodiments below can be practiced on any of a number of power machines, including power machines of different types from the representative power machine shown in FIGS. 2-3. Power machines, for the purposes of this discussion, include a frame, at least one work element, and a power source that is capable of providing power to the work element to accomplish a work task. One type of power machine is a self-propelled work vehicle. Self-propelled work vehicles are a class of power machines that include a frame, work element, and a power source that is capable of providing power to the work element. At least one of the work elements is a motive system for moving the power machine under power.

Figure 1:
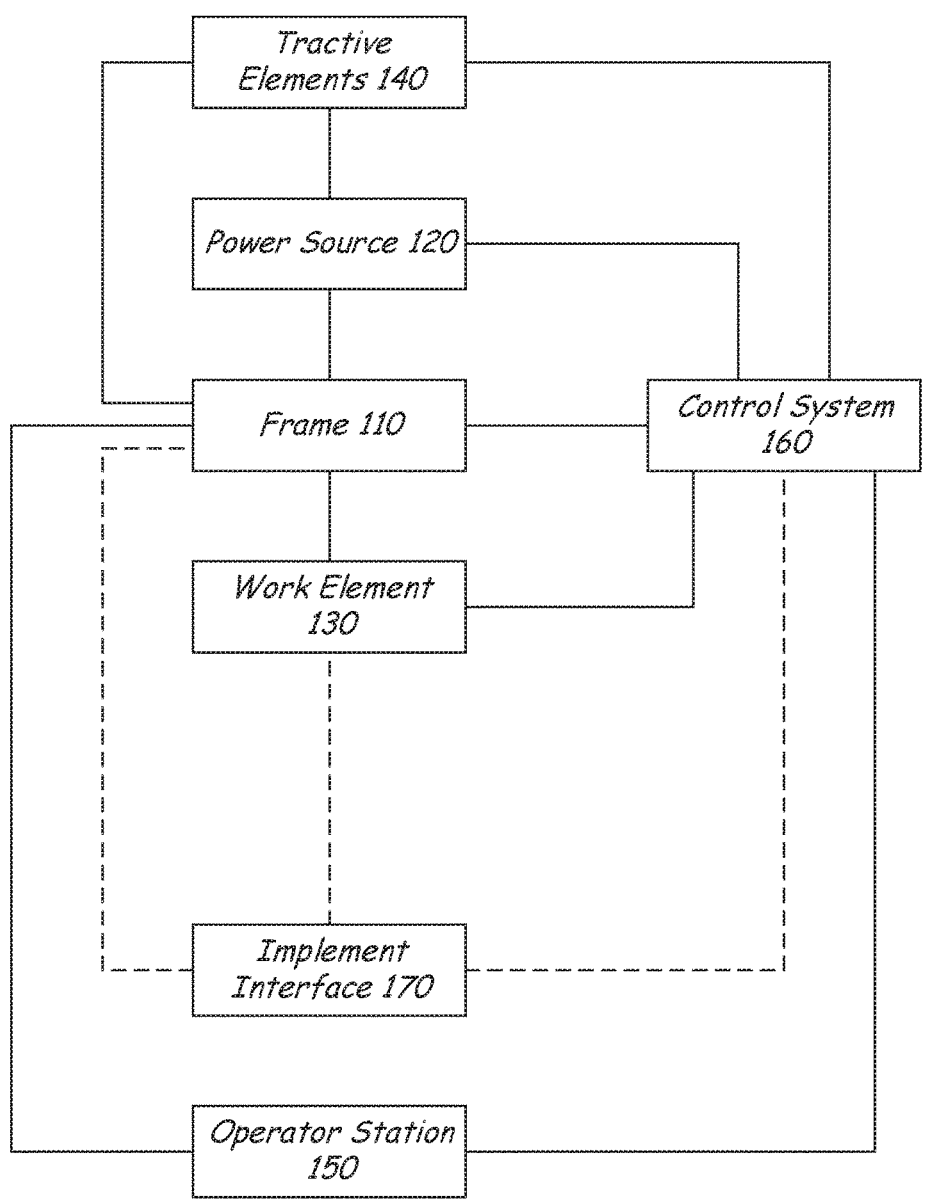
FIG. 1 is a block diagram illustrating functional systems of a representative power machine on which embodiments of the present disclosure can be practiced.

FIG. 1 illustrates a block diagram illustrates the basic systems of a power machine 100 upon which the embodiments discussed below can be advantageously incorporated and can be any of a number of different types of power machines. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that are capable of performing a dedicated task. For example, some work vehicles have a lift arm to which an implement such as a bucket is attached such as by a pinning arrangement. The work element, i.e., the lift arm can be manipulated to position the implement for the purpose of performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element. One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that is capable of moving with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is capable of providing power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that capable of using it to perform a work function. Power sources for power machines typically include an engine such as an internal combustion engine and a power conversion system such as a mechanical transmission or a hydraulic system that is capable of converting the output from an engine into a form of power that is usable by a work element. Other types of power sources can be incorporated into power machines, including electrical sources or a combination of power sources, known generally as hybrid power sources.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, wheels attached to an axle, track assemblies, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 includes an operator compartment defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator controlled functions of the power machine can be operated from an operating position associated with an implement that is coupled to the power machine. Alternatively, with some power machines, a remote control device can be provided (i.e. remote from both of the power machine and any implement to which is it coupled) that is capable of controlling at least some of the operator controlled functions on the power machine.

FIGS. 2-3 illustrates a loader 200, which is one particular example of a power machine of the type illustrated in FIG. 1 where the embodiments discussed below can be advantageously employed. Loader 200 is a track loader and more particularly, a compact track loader. A track loader is a loader that has endless tracks as tractive elements (as opposed to wheels). Track loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Track loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with loader 200 being only one of those power machines. For example, some or all of the concepts discussed below can be practiced on many other types of work vehicles such as various other loaders, excavators, trenchers, and dozers, to name but a few examples.

Various power machines that are capable of including and/or interacting with the embodiments discussed below can have various different frame components that support various work elements. The elements of frame 210 discussed herein are provided for illustrative purposes and should not be considered to be the only type of frame that a power machine on which the embodiments can be practiced can employ. Frame 210 of power machine 200 includes an undercarriage 211 and a mainframe 212 that is supported by the undercarriage. The mainframe 212 of power machine 200 is attached to the undercarriage 211 such as with fasteners (not shown) or by welding the undercarriage to the mainframe. Mainframe 212 includes a pair of upright portions 214A and 214B located on either side of the mainframe that support lift arm structure 230 and to which the lift arm structure 230 is pivotally attached. The lift arm structure 230 is illustratively pinned to each of the upright portions 214A and 214B. The combination of mounting features on the upright portions 214A and 214B and the lift arm structure 230 and mounting hardware (including pins used to pin the lift arm structure to the mainframe 212) are collectively referred to as joints 216A and 216B for the purposes of this discussion. Joints 216A and 216B are aligned along an axis 218 so that the lift arm structure is capable of pivoting, as discussed below, with respect to the mainframe 212 about axis 218. Other power machines may not include upright portions on either side of the frame, or may not have a lift arm structure that is mountable to upright portions on either side of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports tractive elements 219, which on power machine 200 include two track assemblies 219A-B. Other power machines can have any number of track assemblies, as appropriate, or other tractive elements, such as wheels.

The lift arm structure 230 shown in FIGS. 2-3 is one of many different types of lift arm structures that can be attached to a power machine such as power machine 200 or other power machines on which embodiments of the present discussion can be practiced. The lift arm structure 230 has a first end 232A that is pivotally coupled to the power machine at joints 216A and 216B and a second end 232B that moves under control of the power machine with respect to the frame 210. The movement (i.e. the raising and lowering of the lift arm structure 230) is described by a travel path, which is shown generally by arrow 237. For the purposes of this discussion, the travel path of the lift arm structure 230 is defined by the path of movement of the second end 232B of the lift arm structure.

The lift arm structure 230 of power machine 200 includes a pair of lift arms 234 that are disposed on opposing sides of the frame 210. Each of the lift arms 234 includes a first portion 234A and a second portion 234B, which is pivotally coupled to the first portion 234A. The first portion 234A of each lift arm 234 is pivotally coupled to the frame 210 at one of the joints 218A and 218B and the second portion 234B extends from its connection to the first portion 234A to the second end 232B of the lift arm structure 230. The lift arms 234 are each coupled to a cross member 236. Cross member 236 provides increased structural stability to the lift arm structure 230. A pair of actuators 238, which on some power machines including power machine 200 are hydraulic cylinders configured to receive pressurized fluid from power system 220 (shown in block diagram form in FIGS. 2-3), are pivotally coupled to both the frame 210 and the lift arms 234 at pivotable joints 238A and 238B, respectively, on either side of the power machine 200. The actuators 238 are sometimes referred to individually and collectively as lift cylinders. Actuation (i.e., extension and retraction) of the actuators 238 cause the lift arm structure 230 to pivot about joints 218A and 218B and thereby be raised and lowered along the path illustrated by arrow 238, which is generally a vertical path. A pair of control links 217 is pivotally mounted to the frame 210 and the lift arm structure 230 on either side of the frame. The control links 217 help to define the travel path of the lift arm structure. The lift arm structure 230 is representative of one type of lift arm structure that may be coupled to the power machine 200. Other lift arm structures, with different geometries, components, and arrangements can be pivotally coupled to the power machine 200 or other power machines upon which the embodiments discussed herein can be practiced without departing from the scope of the present discussion. For example, other machines can have lift arm structures that are pivotally coupled to a frame that have a generally radial travel path. Other lift arm structures can have an extendable or telescoping lift arm. Still other lift arm structures can have multiple (i.e. more than two) portions segments. Some lift arms, most notably lift arms on excavators, can have portions that are controllable to pivot with respect to another segment instead of moving in concert as is the case in the lift arm structure 230 shown in FIGS. 2-3. Some power machines have lift arm structures with a single lift arm, such as is known in excavators or even some loaders and other power machines. Other power machines can have a plurality of lift arm structures, such as is the case with tractor loader backhoes.

Frame 210 supports and generally encloses the power system 220 so that the various components of the power system 220 are not visible in FIGS. 2-3. Power system 220 includes one or more power sources that are capable of generating and/or storing power for use on various machine functions. On power machine 200, the power system 220 includes an internal combustion engine. Other power machines can include electric generators, rechargeable batteries, various other power sources or any combination of power sources that are capable of providing power for given power machine components. The power system 220 also includes a power conversion system, which is operably coupled to the power source. Power conversion system is, in turn, coupled to one or more actuators, which are capable of performing a function on the power machine. Power conversion systems in various power machines can include various components, including mechanical transmissions, hydraulic systems, and the like. The power conversion system of power machine 200 includes a pair of hydrostatic drive pumps, which are controllable to provide a power signal to drive motors. The drive motors in turn are each operably coupled to axles. The axles are in turn coupled to tractive elements 219A and 219B, respectively. The arrangement of drive pumps, motors, and axles in power machine 200 is but one example of an arrangement of these components. Various other configurations and combinations of hydraulic drive pumps and motors can be employed as may be advantageous. The power conversion system 220 can also be configured to selectively supply pressurized hydraulic fluid to actuators such as lift cylinders 238.

Loader 200 also includes an implement carrier interface 270 that is configured to accept and secure any one of a plurality of different types of implements thereto. The implement carrier interface 270 includes an implement carrier 272 capable of being attached to a plurality of different implements, changing from one implement to another can be accomplished with relative ease. For example, machines with implement carriers can provide an actuator between the implement carrier and the lift arm structure, so that removing or attaching an implement does not involve removing or attaching an actuator from the implement or removing or attaching the implement from the lift arm structure. The implement carrier 272 provides a mounting structure for easily attaching an implement to the lift arm (or other portion of a power machine) that a lift arm structure without an implement carrier does not have. Some loaders do not have an implement carrier but rather have implements directly pinned to the lift arm. The implement carrier interface 270 can also include one or more power sources 274 for selectively providing power to control actuators on an implement that is coupled to the loader 200. The power sources 274 illustratively include couplers to provide hydraulic and electrical signals to an implement.

Power machine 200 has a cab 250, which defines, in part, an operator compartment 252. The cab 250 is pivotally coupled to the frame 210 at joints 254. The cab 250 can be moved from an operating position as shown in FIGS. 2-3 to a service position, where the cab is moved to allow access to components that are covered when the cab is in the operating position. The cab has a seat and control levers 260 that can be manipulated to control functions on the loader such as drive control. In the loader 200, the control levers are pivotally mounted to the frame 210. As mentioned above, cab 250 is pivotally coupled to the frame 210, but in some power machines on which the embodiments disclosed herein can be advantageously practiced, a cab may move between an operating position and a service position in a path other than the radial path of cab 250. For example, the cab may move horizontally, vertically, or along some other path. Control levers 260 can be operable by hands or alternatively can be controlled by feet (i.e. foot pedals).

As discussed above, the implement carrier interface 270 is capable of accepting and securing any of a number of different implements for use to accomplish various tasks. The implement carrier interface 270 and implements capable of being secured to the implement carrier interface 270 provide for flexibility of use of power machine 200, thereby allowing an operator to perform many different tasks with the same power machine. Because the implement carrier interface 270 is designed to accept and secure different implements by engaging attachment features (described below), implements can be attached to and removed from the power machine quickly and without the use of tools. In certain jobs, an operator may repeatedly change implements (i.e., remove one implement and attach another) during a given work event to perform various tasks. The form of implement carrier 272 is generally related to the type of power machine (i.e. a front end loader) on which it is coupled. Other power machines, excavators being one example, can have other implement carriers that provide the same or similar functions as implement carrier 272 while having substantially different shapes and somewhat different engagement and/or locking mechanisms as may be appropriate on a given type of machine.

Figure 4:
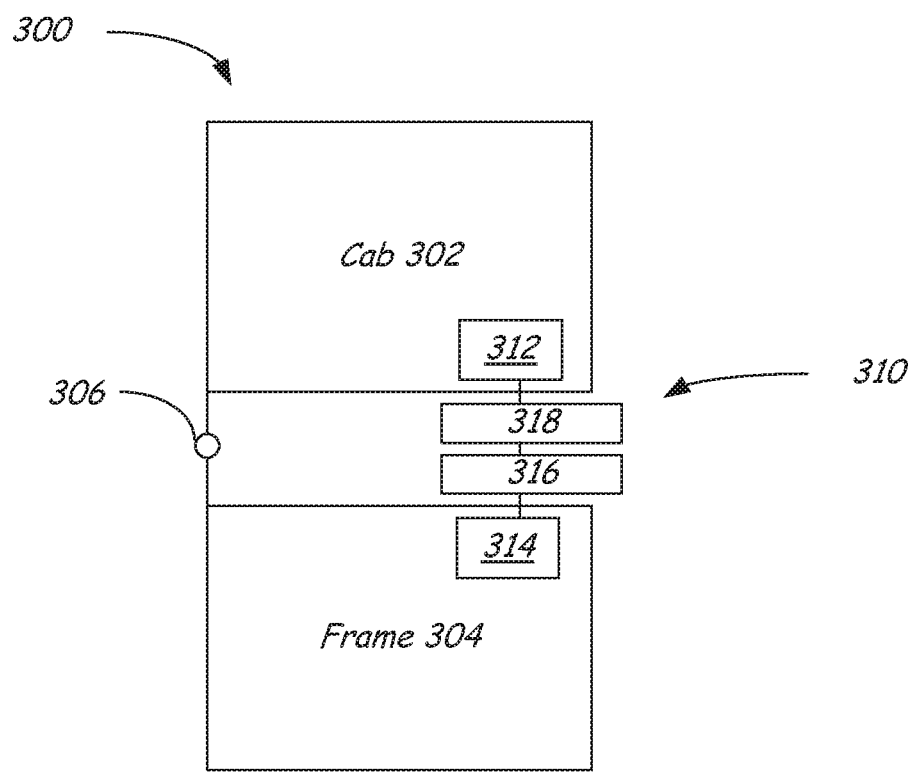
FIG. 4 is block diagram illustrating portions of a power machine having mechanical linkage between an operator input device and an actuator, according to one illustrative embodiment.

FIG. 4 illustrates a block diagram of a portion of a power machine 300 having an operator compartment in the form of a cab 302, which is mounted to a frame 304. The cab 302 is capable of pivoting with respect to the frame at joint 306. The loader 200 is one example of a power machine with a cab that can pivot with respect to a frame to allow easy service access to various components. Power machine 300 includes a mechanical linkage 310 for translating operator inputs into drive control signals for operating one or more drive pumps of the type that can advantageously incorporate embodiments of the present disclosure. The power machine 300 includes one or more operator input devices 312, which are accessible from within cab 302, and one or more drive pumps 314, which are operably coupled to the frame 304. Mechanical linkage 310 is operably coupled to the one or more operator input devices 312 and the one or more drive pumps 314 to translate operator control signals to the drive pumps 314.

The mechanical linkage 310 as illustrated in FIG. 4 includes a link 316 and a junction 318. The link 316 is operably coupled on one end to the (or to one of the) drive pump(s) 314 (for example, to a pintle lever on a drive pump) and on the other end to the junction 318. Junction 318 is in turn operably coupled to the (or to one of the) operator input(s) 312 so that manipulation of the operator input 312 by an operator is translated to the drive pump 314 via the junction 318 and link 316.

In many loaders, including the loader 200 shown in FIGS. 2-3, the operator input devices are operably coupled to the frame of the loader so that when a cab is pivoted from an operating position (as shown in FIG. 2) to a service position, the operator input devices remain with the frame—that is, they do not pivot with the cab. In certain circumstances, however, it may be advantageous to have the operator input devices that can pivot with the cab when it is raised from an operating position to a service position. For example, in the instances where the operator input devices are operably coupled to the frame, the operator compartment of the loader is not solely defined by the cab, but rather by a combination of the cab and part of the loader frame.

To have a loader with a self-contained operator compartment separate from the frame of the loader, the operator input devices are most advantageously operably coupled to the cab. However, to properly control the drive pumps, a mechanical connection between the operator input devices must still be accomplished. In addition, because the mechanical linkage is contained within the frame and not accessible when the cab is the operating position, connection and disconnection of the operator input devices from the mechanical linkage cannot be easily accomplished.

Figure 5:
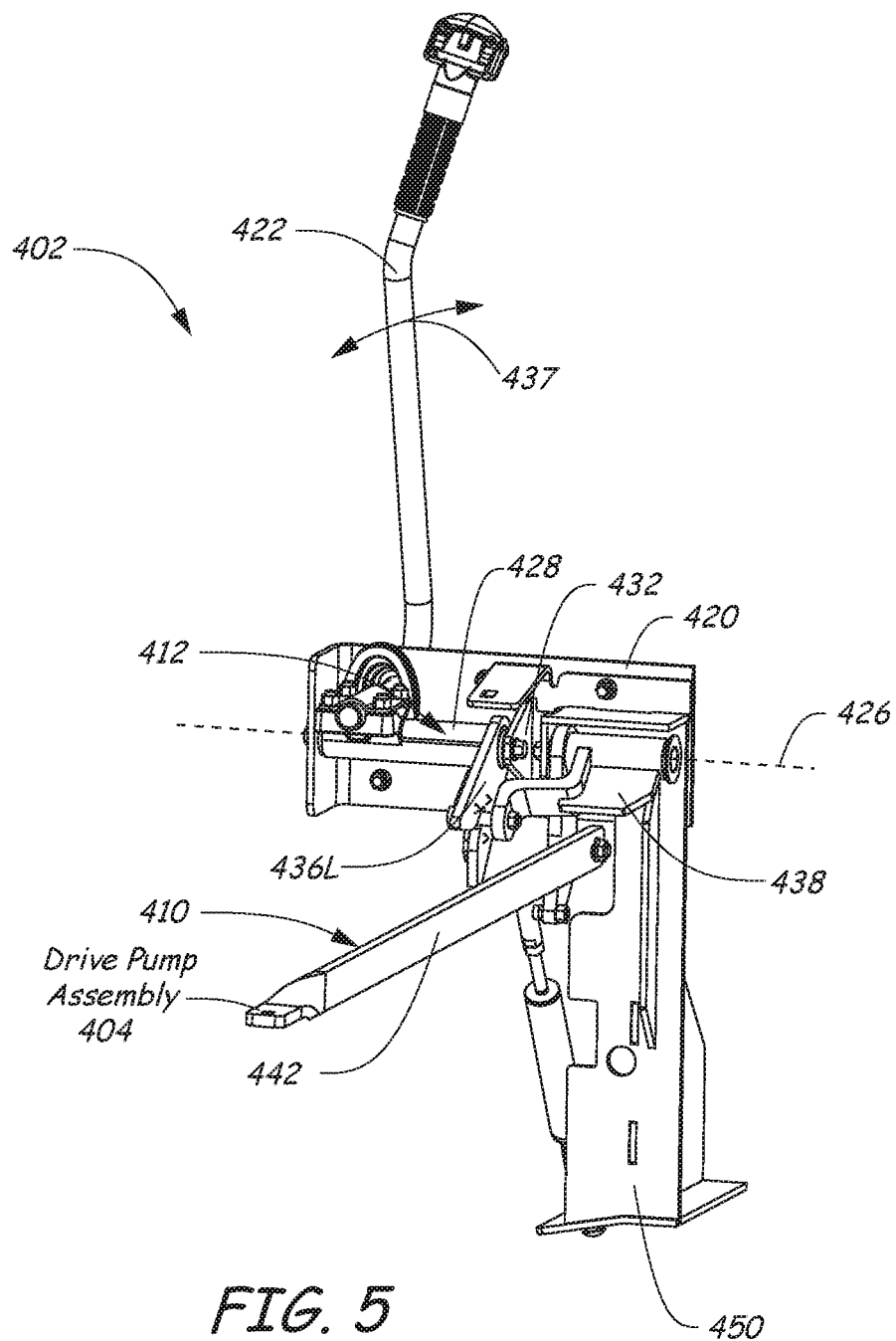
FIG. 5 illustrates a control assembly for controlling actuators including operator input devices, actuators and mechanical linkage between an operator input device and an actuator, according to one illustrative embodiment.

FIG. 5 illustrates a portion of a control assembly 400 that illustrates a mechanical linkage 410 that includes a junction 412 that provides a connection/disconnection structure between an operator input assembly 402 and a drive pump assembly according to one illustrative embodiment. As will be described in more detail below, the junction 412 is a two-part junction that can be connected and disconnected automatically as a cab is moved from between an operating position and a service position. FIG. 5 illustrates an operating input lever in an operating position. That is, even though the cab is not shown in FIG. 5 the representation shown in FIG. 5 is how the operating input levers will be positioned when the cab is in the operating position. First, though, the operator input assembly 402 includes a panel 420 to which an operator input lever 422 is operably coupled. Although not shown, a second operator input lever can also be coupled to the panel. The operator input lever 422 is generally referred to as a left operator input lever and a second operator lever (not shown) is generally referred to as a right operator input lever, each of which is independently controlled. These operator levers are generally coupled to left and right drive pumps, respectively. In the example shown in FIG. 5, the left operator input lever 422 is operably coupled to a drive pump assembly 404 via a control link 442. In power machines such as loader 200, steering is controlled by skid steering. In skid steer machines, tractive elements on each side of the machine are independently controlled and one way to control such tractive elements is by providing left and right operator input of steering levers of the type illustrated in FIG. 5. In other power machines, including power machines that may employ mechanical linkages of the type shown in FIG. 5, driving and steering may be accomplished by other means. In other words, the structures disclosed herein may be adapted to power machines other than skid steer loaders with left and right steering levers. In still other embodiments, the linkage can link foot pedals to actuators such as drive pumps, valve spools, and the like.

Left operating input lever 422 is coupled to a first portion 428 of a left junction 436L, which is rotatably mounted on a pin (not shown) that itself is attached to the panel 420 via a bracket 432. Thus manipulation of left operating input lever 422 along a path shown generally by arrow 437 will cause first portion 428 of left junction 436L to rotate about axis 426. Similarly, a right operating input lever (not shown) is coupled to a first portion 430 of right junction 436R (shown in FIG. 8). First portion 430 of right junction 436R is likewise rotatably mounted on a pin (not shown) that is attached to the panel via a bracket 434. Manipulation of the right operating input lever will cause the first portion 430 of right junction 436R to rotate about axis 426.

Figure 7:
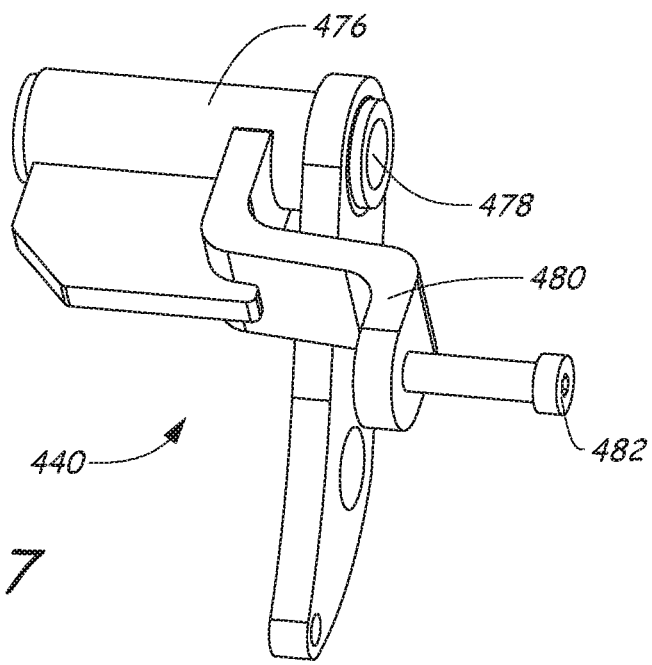
Figure 8:
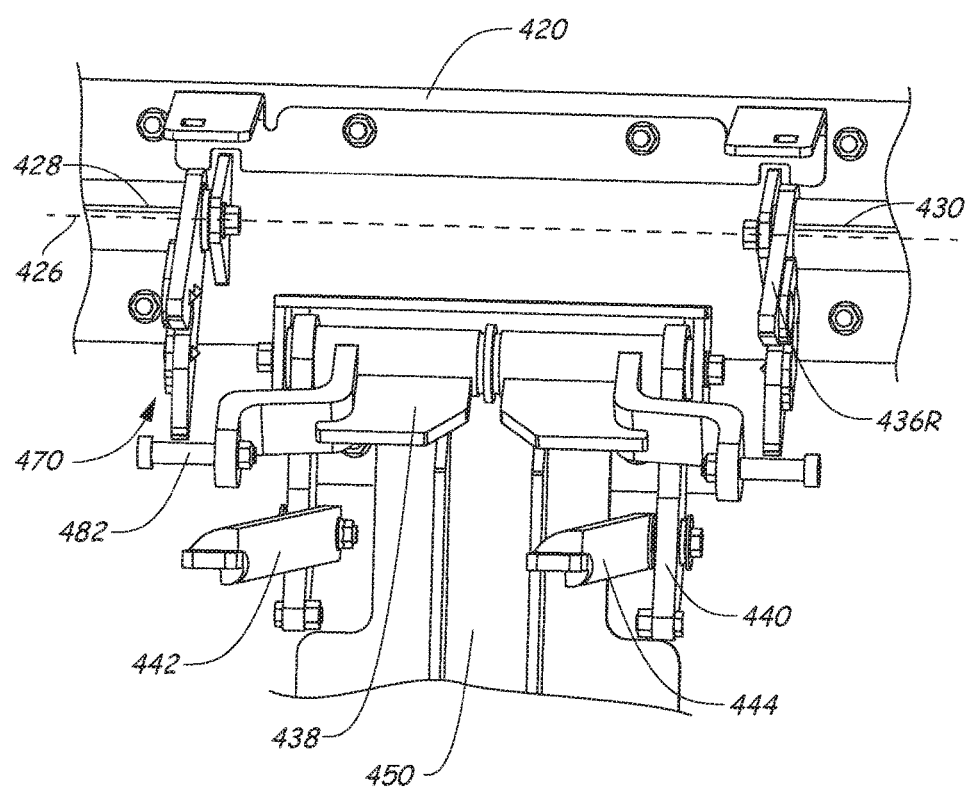
FIG. 8 is a perspective view of the control assembly of FIG. 5, showing the first and second joining members disconnected from each other.

Each of the first portions 428 and 430 of the left and right junctions 436L and 436R are operably coupled to second portions 438 and 440 of left and right junctions, respectively, when the cab is in the operating position (second portion 440 is shown in FIG. 7). Conversely, when the cab is moved to a service position, the respective first and second portions of the left and right junctions are decoupled from each other, thereby breaking the connection between the left and right operating levers from the drive pump assembly 404, which in some embodiments include drive pumps for left and right sides of the machine. The second portions 438 and 440 of the left and right junctions 436L and 436R are rotatably mounted to a tower 450 that is secured to or an integral with the frame of the power machine. The second portions 438 and 440 (second portion 440 is shown in FIG. 8) are rotatable about axis 426 so that when the cab is in an operating position, the first and second portions of each of the left and right junctions 436L and 436R rotate about the same axis 426. Thus, when the cab is in the operating position, the first and second portions of each junction are engaged and rotate together as if each of the left and right junctions is a single structure.

The second portions 438 and 440 of the left and right junctions 436L and 436R are operably coupled to solid links 442 and 444, respectively, which in turn are coupled to the drive pump assembly, for example to left and right drive pumps, respectively. Each of the first portions 428 and 430 has an engagement feature that is complementary with engagement features on second portions 438 and 440 of the left and right junctions to allow for connection and disconnection as the cab moves toward and away from the operating position.

Figure 6:
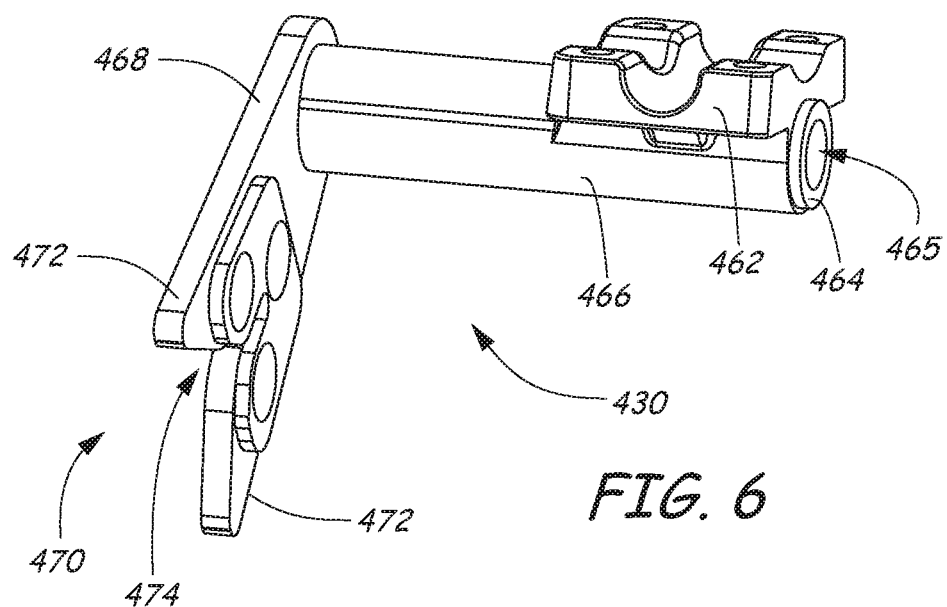
FIGS. 6-7 illustrate one embodiment of a first and second joining members that are configured to form a junction in the mechanical linkage of FIG. 5.

FIGS. 6 and 7 illustrate the first portion 430 and the second portion 440 of the right junction 436R according to one illustrative embodiment. The first portion 430 has a tube 466 into which a pin is inserted to position the first portion along the axis 426 shown in FIG. 5. A bearing surface 464 lines an aperture 465 in the tube 466. A portion of a bracket 462 is fastened to the tube 466 into which the operating input lever can be inserted. A second part of the bracket (not shown) is provided to fixedly secure the operating input lever to the first portion 430. An engagement portion 468 extends perpendicularly from the tube 466. The engagement member 468 includes a pair of fingers 472 that define a tapered opening 470 that will serve to engage a portion of the engagement member on the second portion 440 and guide it a slot 474. The second portion 440 includes a tube 476 with a bearing surface 478 and an engagement wing 480 that includes a protrusion 482 that is sized and positioned to engage and extend through the fingers 472 and be held in the slot. The protrusion 482 can be attached or integral to the engagement wing 480. The fingers 472 are wide enough so that even if one of the operating input levers is actuated when the cab is being lowered into the operating position, the fingers are positioned to engage the protruding member 482. FIG. 8 illustrates the panel 420 positioned away from the tower 450 so that the protrusion 482 is not engaged with the slot 470. FIG. 8 also shows one embodiment of left and right linkages, although in other embodiments, the arrangement of the first and second portions may be positioned in different locations without departing from the scope of the disclosure.

While the fingers are mounted on first portion of the junction and the protrusion is on the second portion of the junction, in other embodiments, the fingers and protrusion can be reversed. In still other embodiments, other types of engagement members can be employed.

The embodiments disclosed provide several advantages. By providing an easily connectable and dis-connectable junction, a self-contained cab that pivots with respect to the frame into a service position from an operating position can be easily employed.

Although the present invention has been described with reference to preferred embodiments, workers skilled in the art will recognize that changes may be made in form and detail without departing from the scope of the discussion.

What is claimed is:

1. A control linkage between an operator input assembly in a cab of a power machine and an actuator coupled to a frame of the power machine, the control linkage comprising:
a junction mechanism configured to make a connection between the operator input assembly and the actuator when the cab is moved to an operating position relative to the frame of the power machine, and configured to break the connection between the operator input assembly and the actuator when the cab is moved to a service position relative to the frame of the power machine, the junction mechanism including a first junction portion operably coupled to the operator input assembly and a second junction portion operably coupled to the actuator, wherein the junction mechanism includes an engagement portion having a pair of fingers defining a tapered opening coupled to one of the first junction portion and the second junction portion, and an engagement portion having a protrusion coupled to the other of the first junction portion and the second junction portion such that the protrusion is guided into the tapered opening by the pair of fingers when the cab is moved from the service position to the operating position.

2. The control linkage of claim 1, wherein the junction mechanism comprises:
wherein the junction mechanism is configured such that the first and second junction portions are coupled together when the cab is in the operating position so that operator manipulation of the operator input assembly actuates the actuator, and such that the first and second junction portions are decoupled from each other when the cab is in the service position.

3. The control linkage of claim 2, wherein the operator input assembly comprises a left operator input lever and a right operator input lever, and wherein the actuator is a first actuator and further comprising a second actuator and wherein:
the first junction portion comprising:
a left first junction portion operably coupled to the left operator input lever and configured to rotate about an axis in response to operator manipulation of the left operator input lever;
a right first junction portion operably coupled to the right operator input lever and configured to rotate about the axis in response to operator manipulation of the right operator input lever;
the second junction portion comprising:
a left second junction portion operably coupled to the first actuator;
a right second junction portion operably coupled to the second actuator;
wherein the junction mechanism is configured such that when the cab is in the operating position the left first junction portion is engaged with the left second junction portion and the right first junction portion is engaged with the right second junction portion, and such that when the cab is in the service position the left first junction portion is disengaged from the left second junction portion and the right first junction portion is disengaged from the right second junction portion.

4. A power machine, comprising:
a frame;
a drive pump assembly coupled to the frame;
a cab pivotally coupled to the frame and configured to be pivoted relative to the frame between an operating position and a service position;
an operator input assembly positioned in the cab; and
a control linkage between the operator input assembly and the drive pump assembly, the control linkage comprising a junction mechanism configured to make a connection between the operator input assembly and the drive pump assembly when the cab is moved to the operating position and to break the connection between the operator input assembly and the drive pump assembly when the cab is moved to the service position.

5. The power machine of claim 4, wherein the junction mechanism of the control linkage comprises:
a first junction portion operably coupled to at least one operator input device of the operator input assembly; and
a second junction portion operably coupled to the drive pump assembly;
wherein the junction mechanism is configured such that the first and second junction portions are coupled together when the cab is in the operating position so that operator manipulation of the at least one operator input device causes mechanical actuation of the drive pump assembly, and such that the first and second junction portions are decoupled from each other when the cab is in the service position.

6. The power machine of claim 5, wherein the at least one operator input device of the operator input assembly comprises a left operator input lever and a right operator input lever, and wherein the drive pump assembly comprises a left drive pump and a right drive pump, and wherein:
the first junction portion includes:
a left first junction portion operably coupled to the left operator input lever and configured to rotate about an axis in response to operator manipulation of the left operator input lever; and
a right first junction portion operably coupled to the right operator input lever and configured to rotate about the axis in response to operator manipulation of the right operator input lever;
the second junction portion includes:
a left second junction portion operably coupled to the left drive pump; and
a right second junction portion operably coupled to the right drive pump; and
wherein the junction mechanism is configured such that when the cab is in the operating position the left first junction portion is engaged with the left second junction portion and the right first junction portion is engaged with the right second junction portion, and such that when the cab is in the service position the left first junction portion is disengaged from the left second junction portion and the right first junction portion is disengaged from the right second junction portion.

7. The power machine of claim 6, wherein one of the right first junction portion and the right second junction portion includes a right engagement portion having a right pair of fingers defining a right tapered opening, and wherein the other of the right first junction portion and the right second junction portion includes a right protrusion such that the right protrusion is guided into the right tapered opening by the right pair of fingers, regardless of an actuation position of the right operator input lever, when the cab is moved from the service position to the operating position.

8. The power machine of claim 7, wherein one of the left first junction portion and the left second junction portion includes a left engagement portion having a left pair of fingers defining a left tapered opening, and wherein the other of the left first junction portion and the left second junction portion includes a left protrusion such that the left protrusion is guided into the left tapered opening by the left pair of fingers, regardless of an actuation position of the left operator input lever, when the cab is moved from the service position to the operating position.

9. A method of coupling an operator input assembly in a cab of a power machine to a drive pump assembly coupled to a frame of the power machine, the method comprising:
moving the cab relative to the frame from a service position to an operating position while the operator input assembly is disconnected from the drive pump assembly and moves with the cab; and
wherein moving the cab from the service position to the operating position causes a connection to be made between the operator input assembly and the drive pump assembly.

10. The method of claim 9, and further comprising:
moving the cab relative to the frame from the operating position to the service position; and
wherein moving the cab from the operating position to the service position causes the connection between the operator input assembly and the drive pump assembly to be broken.

11. The method of claim 10, wherein making the connection between the operator input assembly and the drive pump assembly when the cab reaches the operating position further comprises connecting a first junction portion operably coupled to the operator input assembly to a second junction portion operably coupled to the drive pump assembly.

12. The method of claim 11, wherein connecting the first junction portion to the second junction portion further comprises using a pair of fingers of an engagement portion of one of the first and second junction portions to guide a protrusion of the other of the first and second junction portions into a tapered opening defined by the pair of fingers as the cab is moved to the operating position.

* * * * *